United States Patent [19]

Bland

[11] Patent Number: 4,663,519

[45] Date of Patent: May 5, 1987

[54] WOUND COIL PRODUCTS AND MANUFACTURE THEREOF

[75] Inventor: Randall J. Bland, Shreveport, La.

[73] Assignees: AT&T Company; AT&T Information Systems Inc., both of Murray Hill, N.J.

[21] Appl. No.: 773,692

[22] Filed: Sep. 9, 1985

[51] Int. Cl.⁴ .......................................... G06K 19/06
[52] U.S. Cl. .................................... 235/492; 235/487
[58] Field of Search ............................... 235/487, 492

[56] References Cited

U.S. PATENT DOCUMENTS 3,590,480  7/1971  Johnson ........................ 235/492 X
4,448,716  5/1984  Aigo ............................. 235/492 X

*Primary Examiner*—Harold I. Pitts
*Attorney, Agent, or Firm*—Ruloff F. Kip, Jr.

[57] ABSTRACT

A tape, with holes therein adjacent an edge of the tape, an adhesive surface and a succession of discs on such surface, is moved step by step to advance each disc in turn to a work station having pins outward of that edge. At the station, wire is wound around the disc and the pins to form (a) a wire coil surrounding the disc and adhered to such surface, and (b) wire segments extending from such disc to such pins so that each segment spans one of such holes. The segments are pressed against the surface so that each is adhered thereto on opposite sides of the hole spanned by that segment. The segments are severed at such edge to detach them from the pins, and a piece of the tape bearing the coil and adhered severed segments is severed from the rest of the tape and removed from the station. The assemblage comprising such tape piece and the coil and segments thereon constitutes a useful article of manufacture.

17 Claims, 3 Drawing Figures

WOUND COIL PRODUCTS AND MANUFACTURE THEREOF

FIELD OF INVENTION

This invention relates generally to articles comprising inductive coils and to the manufacture of such articles. More, particularly, this invention relates to the manufacture and structure of articles of such kind adapted for use, for example but without restriction, in microcomputerized transaction cards.

BACKGROUND OF THE INVENTION

Portable cards such as credit cards, identification cards, door opening cards and the like are now commonplace. A recent entry in the field of portable cards is the microcomputerized transaction card, i.e., a laminated plastic card which incorporates within itself a semiconductive microprocessor and memory adapted, when the card is inserted in a slot in a card holder, to interact with circuitry in the holder so as to be powered from the holder and to permit exchange of data between the microprocessor and memory therein and the holder circuitry.

The coupling between card and holder necessary for such interaction has most commonly taken the form of an electromechanical interconnection between them as, say, by providing for the holder a set of small pins adapted when the card is inserted into the holder slot to fit into a mating set of small holes formed in the card to thereby provide a jack-plug connection between card and holder. As a recent development, however, U.S. patent application Ser. No. 664,555 filed Oct. 25, 1984 in the name of R. L. Billings for "Flexible Inductor" and assigned to the assignee hereof and incorporated herein by reference, discloses an alternative arrangement for transferring electrical energy from the holder to a card therein to supply operating power and a clock signal to a microcomputer and memory in the card. In that alternative arrangement, the card includes a flexible inductor coil and a flexible ferromagnetic member adapted upon insertion of the card in the holder to inductively couple the coil to transformer primary means in the holder so that the coil will operate as a transformer secondary means and, in that role, transfer operating power and the clock signal to the microcomputer and memory in the card.

As an extension of that arrangement, U.S. patent application Ser. No. 700,152 filed Feb. 11, 1985 in the name of D. E. Haggan for "Computerized Transaction Card With Inductive Data Transfer" and assigned to the assignee hereof, and incorporated herein by reference, discloses the supplementing of the mentioned power-transfer coil included in a microcomputerized transaction card by other flexible inductor coils included in the same coil and adapted upon insertion of the card in the holder to be inductively. Coupled with other coils in the holder for exchange of data via such coupling between the card and holder.

Transaction card inductor coils of the sort described above are preferably of small diameter such as less than ½" (in order to take up little room in the card), flat (to avoid a bulge in the card), flexible (to be able to flex when the card is bent) and constituted of very small gauge wire. Moreover, preferably the leads for such a coil have and are kept, during manufacture of the card, in fixed positions relative to the body of the coil in order to facilitate later connection of such leads by automatic means to other circuit elements in the card. There is a need for manufacturing methods yielding inductor coils and leads therefor having such special features. Also there is a need for a methods of such kind which, to save time, expense and effort, are capable of producing such coils by assembly line techniques lending themselves to automation.

SUMMARY OF THE INVENTION

Such needs are met according to an aspect of the invention hereof by an inductive coil manufacturing method comprising, providing at a work station an elongated movable tape and wire anchoring means outward of an edge thereof, the tape having an adhesive surface and perforations in such surface and through such tape in the form of holes spaced along the tape inward of that edge, manipulating at such station a supply of wire to form therefrom a wire coil and to attach to said wire anchoring means a plurality of wire segments constituting extensions of the wire in the coil, adhering at said station to said surface (a) said coil positioned inward of said holes and (b) respective wire portions of said segments positioned so that each of said portions spans one of said holes and is bonded to such surface on opposite sides of that hole, severing each of such segments outward of the hole spanned thereby to disconnect said portions of said segments from said anchoring means, and moving said tape to remove from said station an assemblage comprising said coil and wire portions and a length of said tape on which said coil and wire portions are adhered and positioned as aforesaid. Such method is adapted in appropriate applications thereof to yield inductor coils having one or more of the mentioned special features. Moreover, such method is adapted in appropriate applications thereof to yield inductor coils by assembly line techniques lending themselves to automation.

The invention hereof in another of its aspects embraces articles of manufacture which may be produced by, for example but without restriction, the manufacturing method just described.

BRIEF DESCRIPTION OF THE DRAWINGS

For a better understanding of the invention hereof, reference is made to the following description of representative methods and articles embodying such invention and to the accompanying drawings wherein.

DETAILED DESCRIPTION OF APPARATUS

Figure 1:
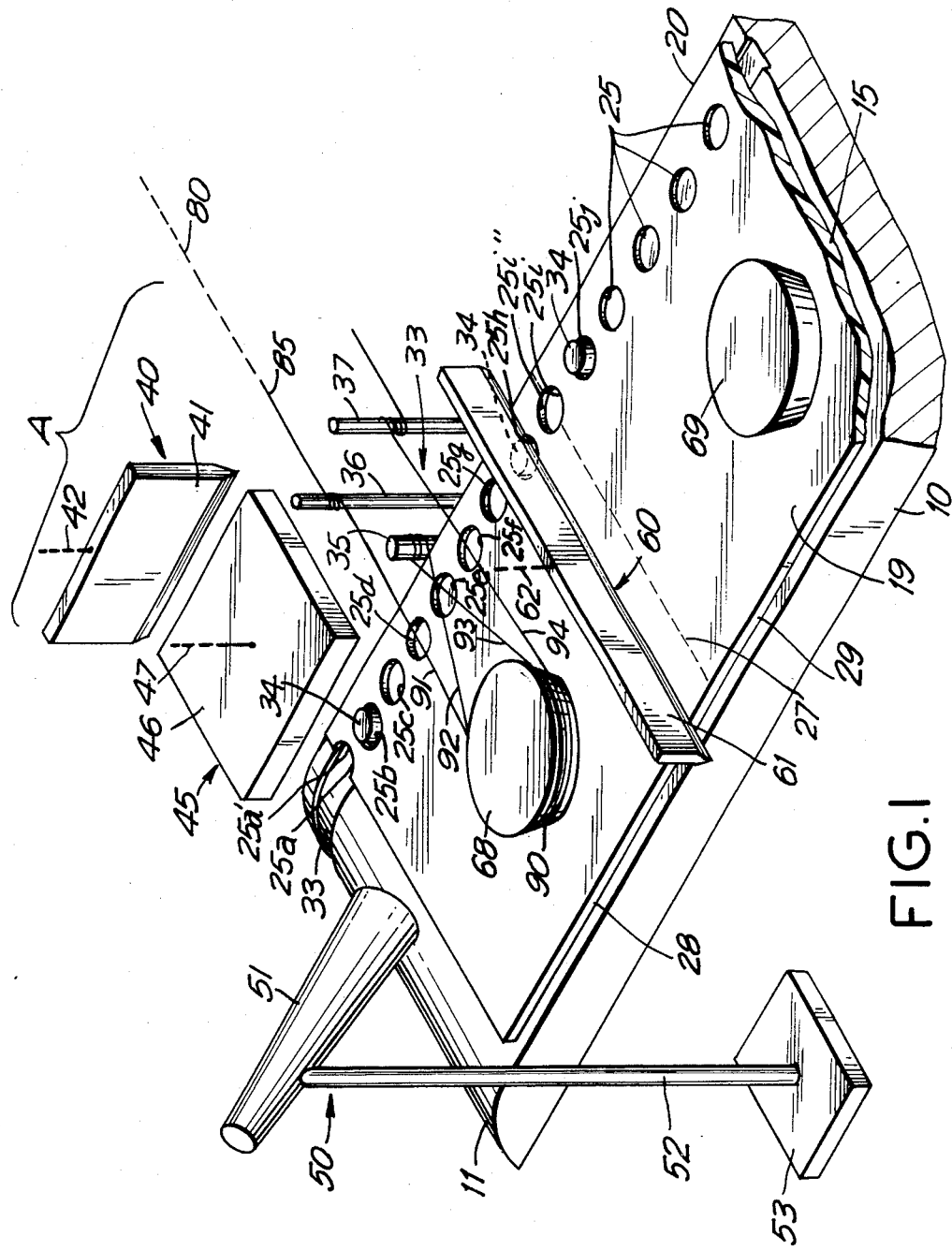
FIG. 1 is an isometric schematic view of apparatus for carrying out an exemplary method of manufacture of inductor coils according to the invention.

Referring now to FIG. 1, the reference numeral 10 designates a platform for supporting an elongated carrier tape 15 movable stepwise in its elongation direction from right to left along platform 10 from a source (not shown) of the tape to a work station A and then beyond that work station to the platform's left hand end where the platform terminates in a downwardly curving discharge lip 11. Tape 15 comprises an elongated flexible synthetic resinous base 16 (FIG. 2) and upper and lower outside layers 17 and 18 of adhesive material which is preferably a pressure-sensitive adhesive, and which provides an adhesive upper surface 19 for tape 15. Such tape may conveniently be a Kapton ® tape with silicon adhesive layers, the tape being manufactured by the Dupont Company of Wilmington, Del. The adhesive underlayer 18 of the tape has adhered to the outside thereof a protective paper backing 14.

The tape 15 has formed therein adjacent and parallel to an edge 20 thereof a series of perforations or holes 25 having respective centers all lying on the same straight line parallel to that edge. The holes 25 pass from surface 19 downward entirely though the tape, and those holes are spaced from each other longitudinally of the tape with equal predetermined distances between hole centers.

The holes 25 are divisible, by longitudinally spaced cut lines 26,27 extending laterally across the tape through the center of every eighth hole, into successive hole groups on successive equal-length pieces 28,29 etc. into which tape 15 is longitudinally divisible. The hole group associated with piece 28 consists of outermost half holes 25a' and 25i'' which are parts of, respectively, original holes 25a and 25i in the tape, a central hole 25e for the group, two holes 25d and 25f flanking hole 25e on either side, two holes 25b and 25c between the left half-hole 25a' and the left flanking hole 25d and two more holes 25g and 25h between the right flanking hole 25f and the right half hole 25i''. The hole group just described is typical of succeeding hole groups on the tape. As shown in FIG. 1, the tape 15 has been severed at cutline 26 so that all that remains of original hole 25a is the half-hole 25a'. On the other hand, the tape has not yet been severed along cut line 26, wherefore hole 25i remains intact.

Tape 15 is driven by a tractor feed mechanism which may conveniently comprise an endless belt (not shown) having an upper side received in a recessed lengthwise guideway 33 formed in platform 10. The belt bears on its outer surface a succession of sprocket teeth 34 projecting outward from the belt to enter into those of holes 25 adjacent to and on opposite sides of the holes bisected by cut lines. Thus, as shown in FIG. 1, one such tooth 34 projects up through hole 25b, and two more of such teeth 34 project up through, respectively, the holes 25h and 25j, adjacent to and on opposite sides of the hole 25i bisected by cut line 27. The described tractor feed mechanism is adapted by advancing the sprocket teeth step by step to move each of the pieces 28, 29 etc. of tape 15 to work station A, to cause each such piece brought to that station to have there a dwell period during which various operations to be later described are performed on that piece, and, thereafter, to remove such piece from work station A and cause discharge of the piece (which now has become severed from the rest of the tape) over the discharge lip 11 to fall into a receiving bin (not shown).

Located at work station A outward of edge 20 is wire anchoring means 33 comprising a center vertical pin 35 and two vertical side pins 36 and 37 on opposite longitudinal sides of pin 35. Pins 35-37 are fixedly positioned in relation to platform 10 with pin 35 being laterally close to tape edge 20, while pins 36 and 37 are laterally spaced farther back from that edge. Pins 35, 36 and 37 occupy respective predetermined positions which are referenced longitudinally and laterally to the positions occupied by sprocket teeth 34 between their step-by-step advancements.

Also located at work station A are the following mechanisms.

First, there is a wire severer 40 schematically represented in FIG. 1 by a longitudinally aligned blade 41 shown in FIG. 1 in its "up" position at which the blade is over the gap between tape edge 20 and pins 35-37. Blade 41 is mounted on the bottom of a vertically reciprocable rode 42 by which the blade is movable between its "up" position and a "down" position therefor.

Another mechanism is a wire presser 45 schematically represented in that figure by a pressing pad 46 shown in FIG. 1 in its "up" position at which it is disposed over a region of tape piece 28 which extends inwards from tape edge and includes holes 25d, 25e and 25f. Pad 46 is mounted on the bottom of a vertically reciprocable rod 47 by which the pad is movable between its "up" position and a "down" position therefor.

A third mechanism is a heater 50 comprising a heater manifold 51 supported by a post 52 upstanding from a stand 53. Manifold 51 when turned on is adapted to direct a stream of hot air into the central region of the tape piece at work station A.

A fourth mechanism at that station is a tape severer 60 schematically represented by a laterally aligned blade 61 shown in FIG. 1 as being in "up" position over tape 15. Blade 61 is mounted on the bottom of a vertically reciprocable rod 62 by which blade 61 is movable between its "up" position and a "down" position therefor.

The tape 15 is a carrier for a succession of plastic coil forming discs 68, 69 etc. adhered to the adhesive surface 19 of the tape and spaced along it so that one such disc is disposed on each one of the pieces 28, 29, etc. of the tape at the longitudinal center of that piece. Each such disc is displaced from tape edge 20 so that the disc is laterally inward of the mentioned region on that piece which is the downward projection thereon of the underface of pressing pad 46. Discs 68, 69 etc. are applied to tape 15 prior to the time that the tape pieces on which the discs reside are brought to work station A. The application of the discs to the tape is such that each of such discs occupies on its corresponding tape piece a position which is referenced and predetermined in relation to the tape holes in the teeth, and which is uniform for all discs and corresponding tape pieces.

Figure 2:
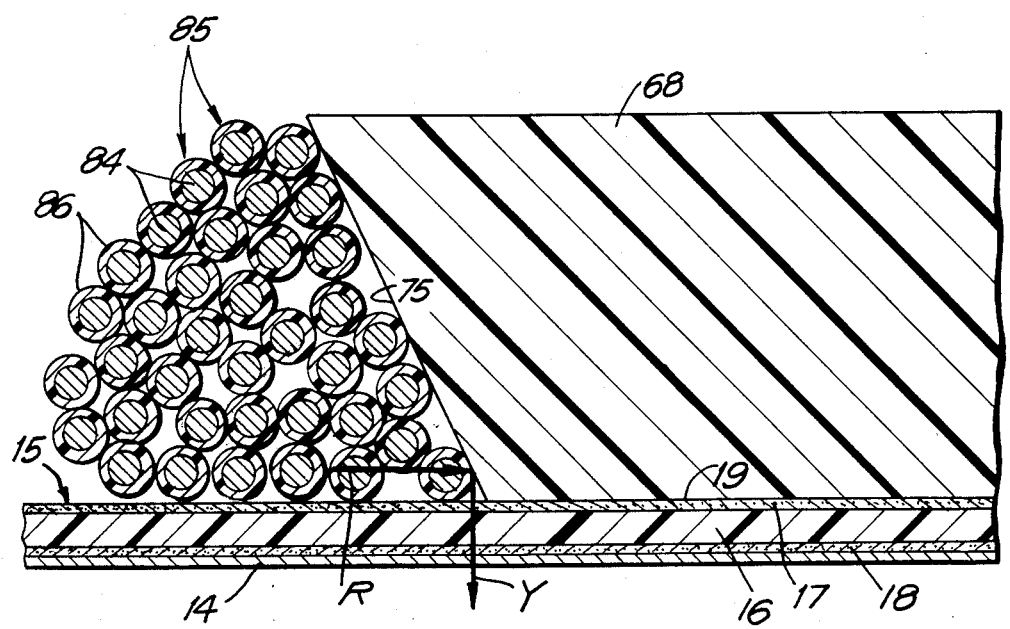
FIG. 2 is an enlarged cross-sectional view of a portion of a coil being manufactured by the practice of the FIG. 1 method, and of portions of other details associated with that coil.

As best shown in FIG. 2, the disc 68 has a peripheral wall 75 which tapers convergently towards the adhesive surface 19 of the tape. That convergent taper can be conveniently imparted to such wall by having disc 68 of inverted frustoconical shape with its smaller planar face being the lower face which contacts tape surface 19. The shape shown for disc 68 in FIG. 2 is typical of the shape of the other discs 69, etc.

The apparatus described above is adapted for manufacture of inductor coils and articles including them by a method as follows.

DETAILED DESCRIPTION OF METHOD AND ARTICLE

To begin (or as an operation preliminary to) a cycle of the method, the described tractor feed mechanism is actuated to undergo one step in a step-by-step movement thereof so as to cause sprocket teeth 34 to advance tape piece 28 to its position shown in FIG. 1. At that position, the piece is at work station A and the center of disc 68 is laterally directly opposite the center axis of central pin 35 with the disc having a predetermined positioning in relation to each of pins 35, 36 and 37 by virtue of the already described predetermined positioning of those pins to sprocket teeth when stationary and the predetermined positioning of the disc to the holes 25 in the tape piece 28 then occupied by those teeth. Tape piece 28 is maintained stationary at work station A for a dwell period during which the following events occur.

At work station A is a conventional "bobbinless" coil winding machine (not shown) of the type in which a supply 80 of wire 85 from a reel (not shown) is fed through an eyelet the movement of which can be controlled by the machine to effect the winding operations desired. Wire 85 is 40 gauge wire or of smaller diameter, and the wire is comprised of a metallic core 84 covered by a thin insulating coating 86 (FIG. 2) adapted to melt upon its heating. Wire 85 is controlled by the winding machine to undergo the following windings: three turns clockwise ("CW") around pin 36, (b) fifteen turns counterclockwise ("CCW") around the periphery of disc 68, (c) three and one-half turns CW around pin 35, (d) fifteen more turns CCW around the periphery of disc 68 and (e) three turns CW around pin 37. As a result of those winding operations, the supply 80 of wire becomes formed into (a) a coil 90 of wire surrounding disc 68 and (b) four wire segments 91, 92, 93, 94 which are extensions of the wire in coil 90. Those segments are attached at their ends away from coil 90 to the wire anchoring means 33 comprising pins 35, 36, 37 by virtue of being wrapped around such pins.

The winding of the outer ends of those segments about pins 35-37 by the winding operations described serves to align and fixedly position the segments in relation to coil 90, tape piece 28 and disc 68. As so fixedly positioned, segment 91 between coil 90 and pin 36 spans and bisects tape hole 25d respective to that segment, segment 94 between coil 90 and pin 37 spans and bisects tape hole 25f respective to that latter segment, and segments 92 and 93 between coil 90 and pin 35 each span the single center tape hole 25e and cross each other over that hole common to both such segments. The several segments 91-94 are so wound about the mentioned pins that all of such segments lie close to the tape adhesive surface 19 but do not yet adhere to that surface.

Considering the relation of segments 91-94 to the turns of wire in coil 90, that coil can be considered as comprising, electrically speaking, two separate fifteen-turn coil windings. Segments 91 and 92 are connected to opposite ends of a first of such coil windings and segments 93 and 94 are connected to opposite ends of the second of such coil windings. These connections of the segments are so poled in relation to the wire turns in the two coil windings constituting coil 90 that an electrical connection between segments 92 and 93 renders the two mentioned coil windings in series-aiding relation with each other when the coil 90 is coupled in a magnetic circuit to be used as the secondary side of a transformer for, say, transforming power from a cord holder to a transaction card.

During the described winding operations, coil 90 becomes adhered to tape surface 19 in a manner as follows. The turns of wire in that coil are wound around the periphery of disc 68 under tension which produces on those turns a radial force R (FIG. 2) urging the wire in those turns radially inward towards the peripheral wall 75 of the disc. The convergent downward taper of wall 75 develops from force R a downwardly directed force component Y acting on the turns of wire being wound around disc 68 to urge those turns down against adhesive surface 19 of the tape 15. That downward urging causes at least the bottom row of such turns to become bonded to the tape surface 19 by the adhesive action of the adhesive layer 17 underlying that surface.

Concurrently with the mentioned winding operations which form coil 90 and wire segments 91-94, heater 50 is turned on to cause heater manifold 51 to direct a stream of hot air to a region on tape piece 28 which includes the turns of wire 85 being wound around disc 68. The heat of such air stream melts the insulation 86 around the wire core 84 of wire 85 to cause the various wire turns wound around disc 68 to each become fused to one or more turns adjacent thereto. Upon completion of the winding operations, heater 50 is turned off to allow the melted insulation 86 in completed coil 90 to cool and reharden and to thus render the coil self-coherent. Because of such self-coherence and of the fact that the bottom turns in such coil have, as described, become "adhered" to the tape surface 19, the entire coil 90 becomes adhered to that surface.

After coil 90 has cooled, or while it is cooling, wire severer 40 is actuated to drive rod 42 down to move blade 41 to its "down" position and cause it to sever wire segments 91-94 at tape edge 20 and, thereby, detach the outer ends of those segments from pins 35-37. The remainder of such segments remain connected to coil 90 to provide leads therefor which are constituted of the major portions of the original segments and are thus designated by the same reference numerals as were the original segments. After segments 91-94 are severed, rod 42 is moved back up to return blade 41 to its standby "up" position.

Moreover, after coil 90 has cooled, or while it is cooling, and before, concurrently with, or after the severing operation performed by blade 41, wire presser 45 is actuated to drive rod 47 down to cause pad 46 to press down onto tape surface 19 to force against tape surface 19 the lengths of wire segments 91-94 overlying that surface. Rod 47 is then retracted to return pad 46 to its standby "up" position. By virtue of being so forced down, those segment lengths become adhered to that surface by the adhesive action of layer 17 so as to be fixedly positioned on that surface in the positions shown in FIGS. 1 and 3. That is, a portion of segment 91 spans tape hole 25d and is adhered to tape 15 at locations 101a, 101b (FIG. 3) on opposite sides of that hole, a portion of segment 94 spans hole 25f and is adhered to tape 15 at locations 104a, 104b on opposite sides of hole 25f, and segments 92 and 93 both span hole 25e and are adhered to tape 15 at locations 102a, 102b and 103a, 103b respective to segments 92, 93 and on opposite sides of hole 25e.

As another operation undertaken at work station A, the tape severer 60 is actuated to drive rod 62 down to move blade 61 to its "down" position and to cause it to sever tape 15 along cut line 27 (FIG. 1) so as to separate tape piece 28 from the rest of tape 15. Rod 62 is then retracted to return blade 61 to its standby "up" position. That tape severing operation is preferably performed after the described adhering and wire segment severing steps, but it may be performed at any time after tape piece 28 is positioned at work station A.

A suitable time interval after tape piece 28 has been severed from the remainder of tape 15, the dwell period for piece 28 to be at work station A is terminated, by the reaction of the tractor feed mechanism to again advance sprocket teeth 34 forward by another step. Prior, however, to such reactuation of the tractor feed mechanism, the wire turns remaining on pins 35, 36, 37 after severance as described of segments 91–94 are stripped from those pins to ready them for the winding operations which take place during the next method cycle.

The one step advancement of sprocket teeth 34 removes tape piece 28 from work station A by displacing it forward until it comes to discharge lip 21 and passes over that lip to fall into a bin. At the same time such one step advancement moves tape piece 29 into the work station for reiteration on that tape piece of the various earlier described operation which took place at the work station in connection with tape piece 28. In this manner, successive inductor coils and their associated leads are formed, adhered to tape 15 and then removed from it by successive method cycles. Note that such a cycle can be considered to begin either with the advancement of a tape piece into work station A or with the commencement of the operations which these take place as that tape piece dwells at that station.

Figure 3:
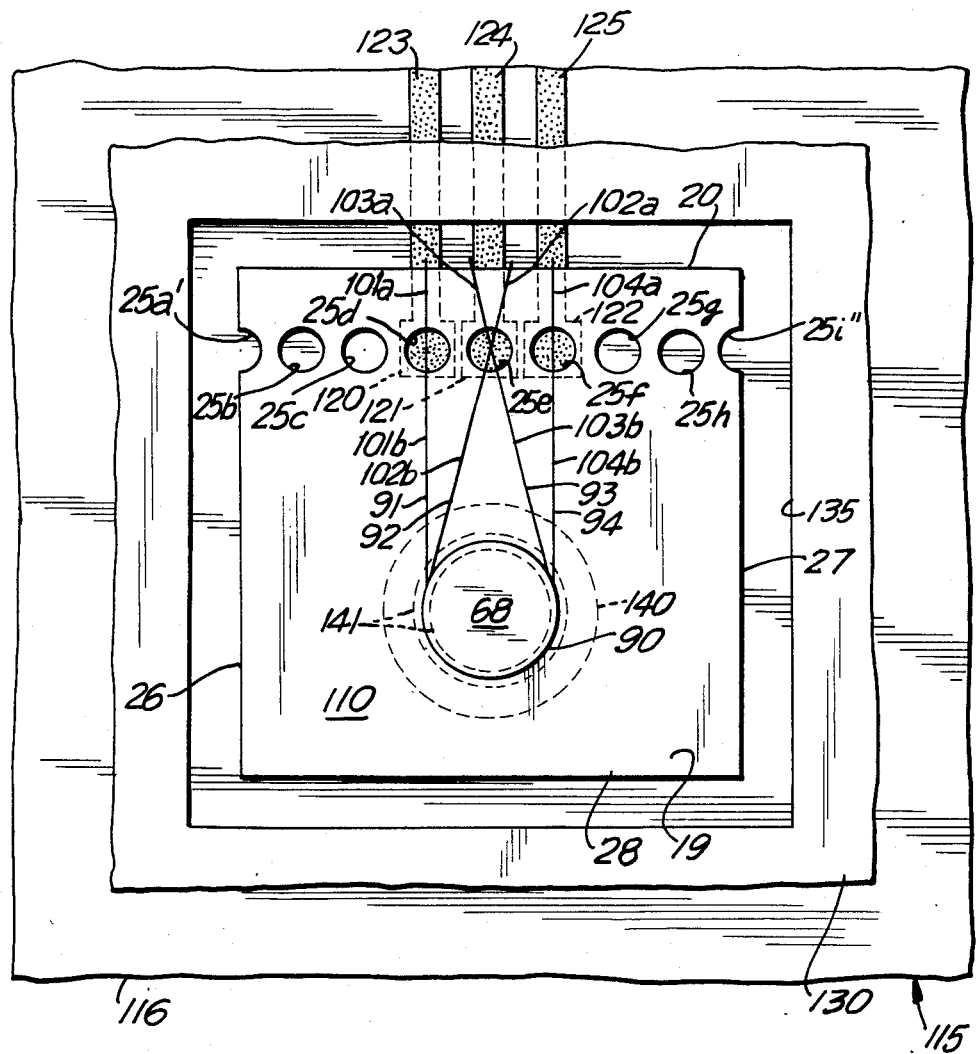
FIG. 3 is a plan view of an article of manufacture resulting from the practice of the FIG. 1 method, and of portions of a microcomputerized transaction card in which such article is incorporated.

The removed tape piece 28 bearing coil 90 and the leads 91–94 is an article of manufacture generally designated in FIG. 3 by the reference numeral 110. Article 110 is depicted in that figure as being part of a microcomputerized transaction card 115 having a laminar structure of which one layer thereof is provided by a laminar sheet in the form of a flexible printed wiring board 116 of which a portion is shown. Board 116 carries on its upper surface printed circuitry including three printed metallic terminal pads 120, 121 and 122 connected to other circuit elements (not shown) on the board by respective printed wire conductors 123, 124 and 125. Overlying board 116 is a structural member 130 including on its underside an adhesive layer (not shown) by which such member is bonded to board 116. Member 130 is, except for such adhesive layer, constituted of a relatively thick fiberglass sheet which imparts to card 115 rigidity but yet is resiliently flexible to the extent of permitting some bending of the card.

Sheet 130 has formed therein a rectangular aperture 135 passing through the sheet all the way to printed wiring board 116 to expose within the aperture's periphery the upper surface of that board. Article 110 is bonded to that exposed surface by removing the protective paper sheet 14 (FIG. 2) from the back side of the article, positioning the article so it is framed by aperture 135 and so that the holes 25d, 25e, 25f in the article register with, respectively, the pads 120, 121, 122 on board 116, and then pressing the article down on the surface of the board. When such is done, the adhesive layer 18 on the underside of article 110 causes that article to adhere firmly to board 116. Thereafter, the portions of leads 91–94 which span the holes 25d, 25e, 25f are pressed down through these holes to contact the pads 120, 121, 122 and those portions are then electromechanically coupled to those pads by well-known ultrasonic welding techniques.

The coil 90 is flexible enough to not much impede some bending of card 115 and to not be injured by such bending. Also coil 90 is flat enough to fit down in aperture 130 well below the upper surface of sheet 130. In fabricating the card 115 there is added over coil 90 a flexible magnetic core member 140 of the type disclosed in the aforementioned Billings application. Core member 140 has formed in its bottom an annular recess 141 in which coil 90 is received, and which recess is deep enough so that the remainder of the bottom of core 140 can and does rest on the printed wiring board 116.

When core 140 is so seated on the board, the top of the core is flush with the upper surface of structural sheet 130.

The fabrication of card 115 is further carried out by bonding to the top of sheet 130 a thin protective plastic sheet (not shown) covering aperture 135 and by then bonding to such protective sheet an outside sheet (not shown) having printed matter on its outside surface. If desired, another outside sheet (not shown) may be bonded to the undersurface of flexible printed wiring board 116.

Some advantages among others of article 110 are as follows.

The carrier member (tape piece) 28 provides for the coil 90 and its leads a support or base which is more easily manipulated than the small coil itself would be and which, thus, facilitates the incorporating of the coil and leads into a larger assemblage such as card 115. Moreover, carrier member 28 affords protection against the coil and its leads being damaged by excessive deformation in the course of handling or use. In such connection the fusing together of the insulation of the wire turns of the coil also affords protection against injury being done to the coil by separation or unraveling from each other of its turns.

The holes 25 in carrier member 28 serve as indicial features by which the positioning of that member can be referenced to other structural means such as printed wiring board 116 so that there can be imparted to holes 25 a highly accurate predetermined position in translation and rotation in the lateral and longitudinal dimensions of tape piece 28 relative to elements on board 116 such as conductor pads 120, 121, 122. Those pads in turn have predetermined positions relative to indicial features provided on or by the board and serving as reference positioning data therefor. As earlier described, there is imparted to coil 90 and its leads, when initially adhered to member 28, a predetermined position of each in translation and rotation, in the lateral and longitudinal dimension of member 28, relative to the holes 25 in that member. That predetermined positioning of the coil and its leads relative to indicia 25 is maintained by the continued adherence of such coil and leads to adhesive surface 19 of member 28. Thus, by virtue of the considerations that such indicia 25 are referenceable in their positioning relative to pads 120, 121, 122 and the coil and its leads are in turn referenced in their positioning relative to indicia 25, it is assured that member 28 is positionable in aperture 135 relative to board 115 so that leads 91–94 of the coil will exactly register with (i.e., extend over) the areas of their corresponding pads without having to undertake the additional, after member 28 is positioned on the board, step of adjusting the positioning of the leads to achieve such registration.

The extension in article 110 of portions of the leads 91–94 over ones of the holes in member 28 has the advantage that such lead portions can be electromechanically connected to other circuit elements by ultrasonic or other techniques generating heat without running the risk that such heat will melt adjacent plastic material so as to spoil the integrity of the electromechanical connection. Moreover that extension in article 110 of portions of the leads 91–94 over ones of the holes 25 in member 28 pemits direct electromechanical connection of those lead portions to circuit elements (e.g. pads 120, 121, 122) underlying that member.

The above described method and article being exemplary only, it is to be understood that additions thereto, omissions therefrom and modifications thereof can be made without departing from the spirit of the invention.

For example, the various operations described herein as being undertaken in the practice of the exemplary method need not necessarily take place sequentially, or if sequentially, in the order in which they have been disclosed herein as occurring or, unless the context otherwise requires, in the order in which they are set forth in the claims which follow.

Further, coil 90 need not have four leads as described but, instead, may omit the two center leads providing the center tap for the coil and retain only the two leads connected to the coil ends which, electrically speaking, are the ends of what can be considered to be a single coil winding.

The invention of course is not restricted to inductor coil manufacture and articles including such coils but, rather, is of application to the manufacture of, and to articles including, other kinds of electric circuit components comprising a main body and leads therefor.

As still another example, the described operations of severing the various tape pieces 28, 29 etc. from the remainder of tape 15, stripping the protective paper layer 14 off the underside of those tape pieces and then pressing those tape pieces down on individual printed wiring boards 116 need not take place wholly as described above. Instead, each such tape piece may be retained integral with the rest of tape 15 until after the paper backing has been stripped off that tape piece, and the operations of severing such tape piece and of pressing it down on its corresponding printed wiring board 116 may then be carried out substantially concurrently.

Accordingly, the invention is not to be considered as limited save as is consonant with the recitals of the following claims.

What is claimed is:

1. A method of inductive coil manufacture comprising: providing at a work station an elongated movable tape and, also, wire anchoring means outward of an edge of said tape, said tape having an adhesive surface perforated by holes spaced along and passing through said tape adjacent said edge, manipulating at said station a supply of wire to form a wire coil and to attach to said anchoring means a plurality of wire segments constituting extensions of the wire in said coil, adhering at said station to said surface (a) said coil so as to be positioned inward of said holes and (b) respective wire portions of said segments positioned so that each of said portions spans one of said holes and is adhered to such surface on opposite sides of that hole, severing each of said segments outward of the hole spanned thereby to disconnect said portions from said means, and moving said tape to remove from said station an assemblage comprising said coil and wire portions and a piece of said tape on which said coil and portions are adhered and positioned as aforesaid.

2. A method according to claim 1 in which said plurality of wire segments comprises a pair of such segments, and in which said manipulating of said supply of wire is conducted to cause respectively portions of such pair of segments to each span a different one of said holes in said tape.

3. A method according to claim 1 in which said plurality of wire segments comprises a pair of such segments, and in which said manipulating of said supply of wire is conducted to cause said respective portions of such pair of segments to each span a one of said holes in said tape common to both such segments.

4. A method according to claim 1 in which said plurality of wire segments comprises a first pair and a second pair of such segments, and in which said manipulating of said wire is conducted to cause said respective portions of such first pair of segments to each span different ones of said holes in said tape, and to cause said respective portions of such second pair of segments to each span another one of said holes common to said second pair of segments.

5. A method according to claim 1 in which said manipulating of said supply of wire includes forming said coil by winding said wire around the peripheral wall of a disc member adhered to said tape surface.

6. A method according to claim 5 in which said peripheral wall of said disc member tapers convergently towards said tape surface, and in which said adhering of said coil to said surface is effected by winding the wire forming said coil under tension, and utilizing said taper to derive from such tension a force component urging turns of the coil being wound against said tape surface to become adhered thereto.

7. A method according to claim 1 further comprising bonding said assemblage to a laminar sheet thereof to the end of forming a transaction card from said assemblage and sheet.

8. An article of manufacture comprising, a piece of synthetic resinous tape having an adhesive surface perforated by holes inward of and spaced along one edge of said tape, and a flat flexible coil of wire and wire leads therefor on said tape piece, said coil being adhesively bonded to said surface inward of said holes, and said leads being adhesively bonded to said surface so that each spans one of said holes and adheres to said surface on opposite sides of that hole.

9. An article of manufacture according to claim 8 in which said leads comprise a pair of such leads of which each spans a different one of said holes.

10. An article of manufacture according to claim 8 in which said leads comprise a pair of such leads which both span one of said holes common to both such leads, and which the leads in said pair cross each other over that hole.

11. An article of manufacture according to claim 8 in which said leads comprise a first pair and a second pair of leads, the leads in said first pair spanning ones of said holes respective to these leads, and in which the leads in said second pair are disposed to span, and to cross each other over, another of said holes commonly spanned by both these loads.

12. An article of manufacture comprising a carrier member having an adhesive surface and indicial features referenceable in their positioning relative to structural means associable with said member to have a fixed predetermined position relative thereto, and a circuit component comprising a main body and leads extending therefrom, said body and said leads each being on and adhered to said surface, and portions of said leads being maintained by said adherence of said leads to said surface in a fixed predetermined position with reference to said indicial features.

13. An article according to claim 12 in which said main body comprises an inductor coil formed of a plurality of turns of wire comprising a metallic core and insulation around said core, the insulation of each of ones of said turns being fused to the insulation of one or more adjacent turns, and in which said leads are constituted of said wire and are leads for said coil.

14. An article according to claim 12 in which said indicial features are constituted of a plurality of holes formed in said surface to pass through said member, and in which said leads are positioned on said member so that each thereof spans one said holes and adheres to said surface on opposite sides of the hole spanned thereby.

15. An article of manufacture comprising, a carrier member having an adhesive surface and a plurality of holes formed in said surface to pass through said member, and an electric circuit component comprising a main body and a plurality of leads therefor, said body and leads each being on and adhered to said surface so that each of such leads extends over one said holes.

16. A method comprising, providing a carrier member having an adhesive surface and indicial features referenceable in their positioning relative to structural means associable with said member to have a fixed predetermined position relative thereto, and adhering to said surface an electric circuit component comprising a main body and a plurality of leads therefor so that both said main body and such leads are adhered to such surface, and so that portions of such leads are each maintained by such adherence of such leads to said surface in a fixed predetermined position with reference to said indicial features.

17. A method comprising, providing a carrier member having an adhesive surface and perforated by holes, and adhering to said surface an electric circuit component comprising a main body and a plurality of leads therefor so that both said main body and such leads are adhered to said surface, and so that each of such leads extends over one of such holes.

* * * * *